US010286897B2

(12) United States Patent
Ries-Mueller

(10) Patent No.: US 10,286,897 B2
(45) Date of Patent: May 14, 2019

(54) METHOD AND DEVICE FOR HEATING ENGINE AND TRANSMISSION OIL OF A HYBRID VEHICLE

(75) Inventor: Klaus Ries-Mueller, Bad Rappenau (DE)

(73) Assignee: ROBERT BOSCH GMBH, Stuttgart (DE)

( * ) Notice: Subject to any disclaimer, the term of this patent is extended or adjusted under 35 U.S.C. 154(b) by 21 days.

(21) Appl. No.: 13/321,321

(22) PCT Filed: Jul. 15, 2010

(86) PCT No.: PCT/EP2010/060184
§ 371 (c)(1),
(2), (4) Date: Feb. 6, 2012

(87) PCT Pub. No.: WO2011/015436
PCT Pub. Date: Feb. 10, 2011

(65) Prior Publication Data
US 2012/0125278 A1  May 24, 2012

(30) Foreign Application Priority Data
Aug. 7, 2009 (DE) .................. 10 2009 028 326

(51) Int. Cl.
*F01M 5/00* (2006.01)
*B60W 20/15* (2016.01)
(Continued)

(52) U.S. Cl.
CPC ............ *B60W 20/15* (2016.01); *B60W 10/06* (2013.01); *B60W 10/08* (2013.01); *B60W 10/10* (2013.01);
(Continued)

(58) Field of Classification Search
CPC ......... F02N 19/10; F02N 19/04; F01M 5/021; F01P 2003/006; F01P 3/12; F01P 2050/24; F15B 21/042; B60H 1/00271; B60H 1/00278; B60H 2001/00307; B60H 1/00314; B60H 1/143
(Continued)

(56) References Cited

U.S. PATENT DOCUMENTS 3,870,855 A * 3/1975 Edlund et al. ................ 219/202
4,249,491 A * 2/1981 Stein ...................... 123/142.5 R
(Continued)

FOREIGN PATENT DOCUMENTS

| CN | 101205850 | 8/2012 |
| DE | 19745167 | 6/1998 |

(Continued)

OTHER PUBLICATIONS

International Search Report, PCT International Application No. PCT/EP2010/060184, dated Jan. 17, 2011.

*Primary Examiner* — Lindsay Low
*Assistant Examiner* — Omar Morales
(74) *Attorney, Agent, or Firm* — Norton Rose Fulbright US LLP; Gerard Messina

(57) ABSTRACT

A method for heating engine and/or transmission oil of a hybrid vehicle having an internal combustion engine and an electric motor, the engine and/or transmission oil being heated with the aid of the waste heat of a charging device for at least one battery and/or the waste heat of the at least one battery.

19 Claims, 3 Drawing Sheets

(51) Int. Cl.
*B60W 10/06* (2006.01)
*B60W 10/08* (2006.01)
*B60W 10/10* (2012.01)
*B60W 30/194* (2012.01)
*F16H 57/04* (2010.01)
*B60W 20/00* (2016.01)

(52) U.S. Cl.
CPC ....... *B60W 30/194* (2013.01); *F16H 57/0413* (2013.01); *B60L 2240/34* (2013.01); *B60W 20/00* (2013.01); *B60W 2510/246* (2013.01); *Y02T 10/6269* (2013.01); *Y02T 10/6286* (2013.01)

(58) Field of Classification Search
USPC .............. 123/142.5 R, 142.5 E, 41.31, 41.33
See application file for complete search history.

(56) References Cited

U.S. PATENT DOCUMENTS

| | | | | |
|---|---|---|---|---|
| 4,385,726 | A * | 5/1983 | Bernauer et al. | 237/12.3 C |
| 4,522,166 | A * | 6/1985 | Toivio et al. | 123/196 A |
| 5,529,114 | A * | 6/1996 | Hall | F01P 7/164 |
| | | | | 165/104.33 |
| 7,147,071 | B2 * | 12/2006 | Gering | B60H 1/00278 |
| | | | | 165/164 |
| 7,464,672 | B2 * | 12/2008 | Vetrovec | 123/41.14 |
| 8,100,106 | B2 * | 1/2012 | Kardos et al. | 123/196 AB |
| 2003/0183184 | A1 * | 10/2003 | Murray et al. | 123/142.5 R |
| 2005/0022769 | A1 * | 2/2005 | Kuze et al. | 123/142.5 R |
| 2008/0078542 | A1 * | 4/2008 | Gering et al. | 165/202 |
| 2008/0211230 | A1 * | 9/2008 | Gurin | B60L 11/1861 |
| | | | | 290/2 |
| 2009/0071428 | A1 * | 3/2009 | Kamiyama | B60H 1/00314 |
| | | | | 123/142.5 R |
| 2010/0218741 | A1 * | 9/2010 | Anthony | 123/200 |

FOREIGN PATENT DOCUMENTS

| | | |
|---|---|---|
| DE | 10332497 | 2/2005 |
| DE | 102008037820 | 5/2009 |
| DE | 102007061562 | 7/2009 |
| EP | 0566854 | 10/1993 |
| GB | 805715 | 12/1958 |
| GB | 2341830 | 3/2000 |
| GB | 2454349 | 5/2009 |
| JP | 10-274020 | 10/1998 |
| JP | 11-313406 | 11/1999 |
| JP | 2000-274240 | 10/2000 |
| JP | 2003-61309 | 2/2003 |
| JP | 2004-270618 | 9/2004 |
| JP | 2005-207387 | 8/2005 |
| JP | 2005-306239 | 11/2005 |
| JP | 2005-325790 | 11/2005 |
| JP | 2008-184981 | 8/2008 |
| JP | 2008-265357 | 11/2008 |
| JP | 2009-143509 | 7/2009 |
| JP | 2009-167875 | 7/2009 |

* cited by examiner

METHOD AND DEVICE FOR HEATING ENGINE AND TRANSMISSION OIL OF A HYBRID VEHICLE

FIELD OF THE INVENTION

The present invention relates to a method for heating engine and/or transmission oil of a hybrid vehicle, and a heating device for engine and/or transmission oil of a hybrid vehicle.

BACKGROUND INFORMATION

Hybrid vehicles are being developed or manufactured to an increasing extent by the automobile industry. The hybrid vehicles, as plug-in hybrid vehicles, have an internal combustion engine and an electric motor. The hybrid vehicle may therefore be driven by the internal combustion engine using a fossil fuel and/or by the electric motor using electrical power from batteries. Charging of the batteries as traction batteries for driving the plug-in hybrid vehicle takes place during idle time of the hybrid vehicle on an external power network, e.g., having a voltage of 220 V. For this purpose, the hybrid vehicle is to be connected to this external power network with the aid of a power cable and a plug connection. A charging device is required for charging the batteries of the hybrid vehicle, which converts the AC voltage of the external power network into DC voltage and transforms the voltage to an extent required for charging the batteries. Such a charging device installed in the hybrid vehicle discharges waste heat during the charging of the batteries of the hybrid vehicle, which is in the range of several hundred watts up to several kilowatts.

German Patent Application No. DE 10 2008 037 820 A1 describes a method for heating the engine oil of a diesel engine of a hybrid electric vehicle. The hybrid electric vehicle is provided with an electric drive system having a cooling circuit and a heat exchanger. The waste heat of the electric drive system is relayed to the engine oil of the diesel engine with the aid of the cooling circuit and the heat exchanger. The electric drive system is therefore cooled and the engine oil of the diesel engine is heated with the aid of the cooling circuit.

SUMMARY

A method according to the present invention for heating engine and/or transmission oil of a hybrid vehicle, in particular a plug-in hybrid vehicle, having an internal combustion engine and an electric motor, the engine and/or transmission oil being heated with the aid of the waste heat of a charging device for at least one battery and/or the waste heat of the at least one battery.

The waste heat of the charging device and/or the battery may therefore be used to heat the engine and/or transmission oil. Internal combustion engines have a higher fuel consumption at lower engine and/or transmission oil temperatures than at higher engine and/or transmission oil temperatures. Heating the engine and/or transmission oil therefore has the effect during a startup of the internal combustion engine that fuel may be saved, e.g., in the range of up to 10%, in relation to non-heated engine and/or transmission oil. The efficiency of the hybrid vehicle may therefore advantageously be increased. The waste heat of the charging device for the at least one battery and the waste heat of the at least one battery occur during charging of the battery anyway, so that no additional energy is advantageously required for heating the engine and/or transmission oil.

In particular, the engine and/or transmission oil is heated during the charging of the at least one battery and/or is heated during the idle time of the hybrid vehicle. The waste heat of the charging device and/or the battery is therefore relayed to the engine and/or transmission oil without a time delay.

In one further embodiment, the engine and/or transmission oil is heated before beginning travel.

In a supplementary specific embodiment, the waste heat is conducted to the engine and/or transmission oil with the aid of heat convection and/or heat conduction and/or thermal radiation.

A fluid circuit, in particular having engine and/or transmission oil as the fluid, is preferably thermally coupled to the charging device and/or to the at least one battery for indirect or direct heating of the engine and/or transmission oil. In the case of direct heating of the engine and/or transmission oil, the engine and/or transmission oil is/are heated directly at the charging device and/or the battery without an intermediate fluid circuit. In the case of indirect heating of the engine and/or transmission oil, the waste heat of the charging device and/or the at least one battery is initially transferred to an intermediate fluid circuit, which is also a fluid circuit, and subsequently transferred from the intermediate fluid circuit to the fluid circuit having the engine and/or transmission oil with the aid of a heat exchanger.

In one variant, the fluid circuit is heated by the waste heat of the charging device and/or the at least one battery.

An actual temperature of the engine and/or transmission oil is advantageously detected, the actual temperature is compared to a setpoint temperature of the engine and/or transmission oil, and the engine and/or transmission oil is/are heated in the event of a deviation of the actual temperature from the setpoint temperature.

In one further embodiment, the waste heat which is not required for heating the engine and/or transmission oil is conducted into surroundings of the hybrid vehicle and/or into the vehicle interior. After the heating of the engine and/or transmission oil to the required setpoint temperature, waste heat subsequently arising at the charging device and/or the at least one battery may be dissipated to the surroundings and/or into the vehicle interior to maintain a setpoint temperature of the charging device and/or the at least one battery.

In one further embodiment, the waste heat of the charging device and/or the at least one battery is stored in a heat storage, e.g., a latent heat storage. Waste heat arising during the charging of the charging device and the battery may therefore be used at a later point in time during travel of the hybrid vehicle, for example, for heating a vehicle interior, the engine oil, and/or the transmission oil.

In an additional embodiment, initially only the engine oil is heated to a predefined setpoint temperature with the aid of the waste heat of the charging device and/or the at least one battery.

In an additional variant, only the transmission oil is heated to a predefined setpoint temperature after the heating of the engine oil to a predefined setpoint temperature.

In one further specific embodiment, after the heating of the engine oil to a predefined setpoint temperature and/or after the heating of the transmission oil to a predefined setpoint temperature, only the vehicle interior is heated with the aid of the waste heat of the charging device and/or the at least one battery.

A heating device according to the present invention for engine and/or transmission oil of a hybrid vehicle, in particular a plug-in hybrid vehicle, having an internal combustion engine and an electric motor, including: a fluid circuit having a fluid, at least one heat source for heating the engine and/or transmission oil with the aid of the fluid circuit, the fluid circuit being thermally coupled to a charging device and/or at least one battery, so that the at least one heat source is the charging device and/or the at least one battery, in order to heat the engine and/or transmission oil with the aid of the waste heat of the charging device and/or the at least one battery.

The waste heat of the charging device and/or the at least one battery may therefore advantageously be used to heat the engine oil and/or the transmission oil. The fuel consumption of the hybrid vehicle may therefore advantageously be reduced during the startup of the internal combustion engine and the drive of the hybrid vehicle with the aid of the internal combustion engine. Additional energy is not required for heating the internal combustion engine, because the waste heat of the charging device and/or the at least one battery may be used to heat the engine and/or transmission oil.

In one further specific embodiment, the fluid of the fluid circuit is the engine and/or transmission oil and the engine and/or transmission oil is/are conductible in the fluid circuit to the charging device and/or the at least one battery to heat the engine and/or transmission oil at the charging device and/or the at least one battery. Engine and/or transmission oil flows in the fluid circuit to the charging device and/or the at least one battery. The heat is transferred from the charging device and/or the at least one battery to the engine and/or transmission oil to heat the engine and/or transmission oil at the charging device and/or the at least one battery with the aid of a heat exchanger. An additional intermediate fluid circuit is therefore not necessary.

In particular, the heating device includes an intermediate fluid circuit, which is thermally coupled to the charging device and/or to the at least one battery.

In one further embodiment, the intermediate fluid circuit is thermally coupled to the engine oil with the aid of an M heat exchanger and/or is thermally coupled to the transmission oil with the aid of a G heat exchanger and/or is thermally coupled to a vehicle interior with the aid of an F heat exchanger. A coolant, i.e., non-engine and/or transmission oil, flows in the intermediate cooling circuit. The M heat exchanger and/or the G heat exchanger is/are heated with the aid of the fluid of the intermediate fluid circuit and the engine oil is heated by the M heat exchanger and the transmission oil is heated by the G heat exchanger. The vehicle interior may also be heated with the aid of an F heat exchanger. A fan is preferably also situated at the F heat exchanger, with the aid of which air may be conducted through the F heat exchanger, which is subsequently introduced into the vehicle interior.

In a supplementary variant, the heating device includes an L temperature sensor for detecting an actual temperature of the charging device and/or a B temperature sensor for detecting an actual temperature of the at least one battery.

In one further variant, the heating device includes an F temperature sensor for detecting an actual temperature of the vehicle interior and/or an M temperature sensor for detecting an actual temperature of the engine oil and/or a G temperature sensor for detecting an actual temperature of the transmission oil. The detected actual temperatures may be compared to setpoint temperatures with the aid of a control unit using the temperatures of the charging device, the at least one battery, the engine oil, the transmission oil, and/or the temperature of the vehicle interior which are detected with the aid of the temperature sensors. To achieve the desired setpoint temperatures, the heating of the engine and/or transmission oil and of the vehicle interior may subsequently be controlled and/or regulated and the cooling of the charging device and/or the at least one battery may be controlled and/or regulated by the control device.

In one further embodiment, a method is described which is executable by the heating device.

A motor vehicle according to the present invention includes a heating device and/or a method executable by the motor vehicle.

BRIEF DESCRIPTION OF THE DRAWINGS

Exemplary embodiments of the present invention are described in greater detail below with reference to the figures.

DETAILED DESCRIPTION OF EXAMPLE EMBODIMENTS

Figure 1:
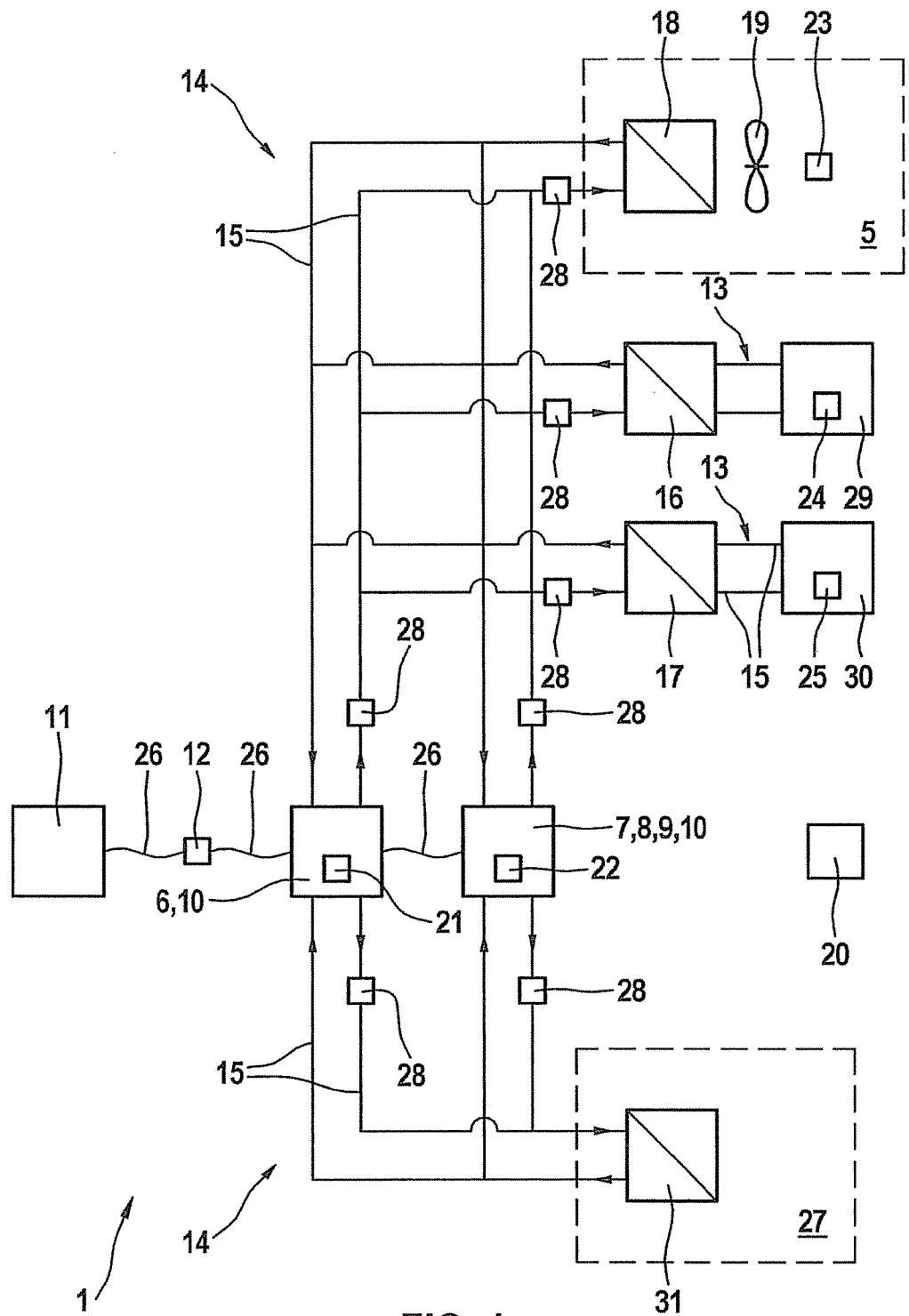
FIG. 1 shows a schematic system diagram of a heating device in a first exemplary embodiment.
Figure 3:
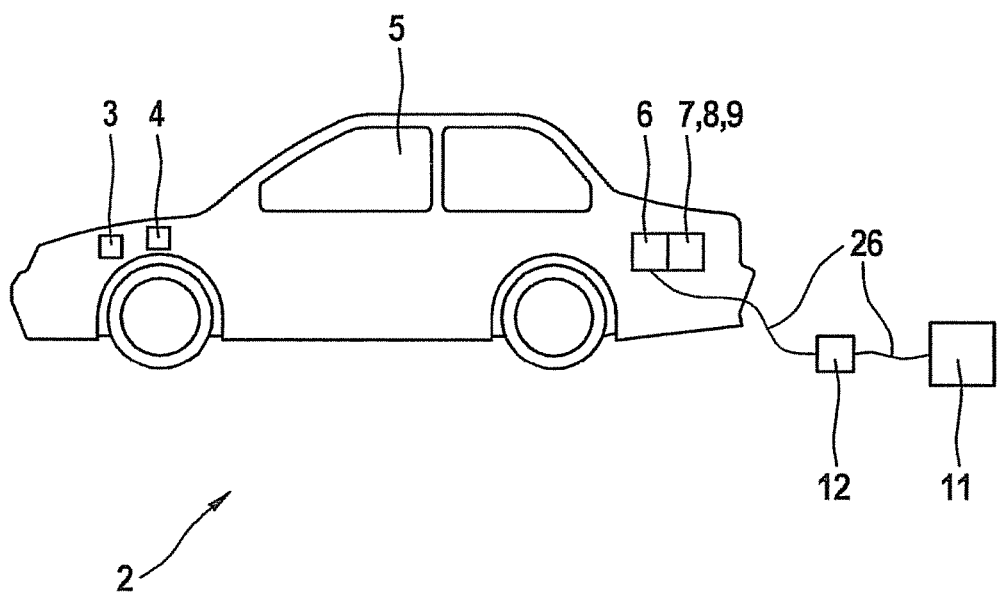
FIG. 3 shows a view of a plug-in hybrid vehicle.

A schematic system diagram of a heating device 1 in a first exemplary embodiment for a hybrid vehicle 2 is shown in FIG. 1. Hybrid vehicle 2, as a plug-in hybrid vehicle, has an internal combustion engine 3 and an electric motor 4 (FIG. 3). Internal combustion engine 3 is driven using fuel from a fuel tank (not shown). Electric motor 4 is operated using electrical current from a battery 7. Both internal combustion engine 3 and electric motor 4 are used to drive hybrid vehicle 2. The plug-in hybrid vehicle may travel exclusively with the aid of electrical power from battery 7, e.g., having an electrical range of 100 km. During the idle time of hybrid vehicle 2, hybrid vehicle 2 is connected to an external power network 11 with the aid of a plug connection 12 and a power cable 26 during the idle time of hybrid vehicle 2. Batteries 7 are charged with the aid of the electrical power from external power network 11.

The electrical AC voltage of external power network 11 is converted into DC voltage with the aid of a charging device 6 (FIGS. 1 through 3) and additionally transformed to a different, e.g., lower, voltage level. This direct current is also conducted with the aid of power circuit cable 26 to traction battery 8, which is designed as a lithium-ion battery 9, and traction battery 8 or battery 7 is charged using this current. Waste heat arises at charging device 6 and at batteries 7 during the charging of battery 7. The waste heat at charging device 6 is in the range of several hundred watts up to several kilowatts, depending on how rapidly batteries 7 are charged. During a rapid charge of batteries 7, up to several kilowatts of heat may therefore arise.

An intermediate fluid circuit 14 is thermally coupled to charging device 6 and battery 7 as heat sources 10 with the aid of a heat exchanger (not shown). The waste heat of charging device 6 and battery 7 may thus be transferred to the coolant of intermediate fluid circuit 14. The coolant therefore flows through lines 15 of intermediate fluid circuit 14 and is circulated in the process in the circuit by a circulating pump (not shown).

An F heat exchanger 18 is connected to intermediate fluid circuit 14. F heat exchanger 18 is used to heat a vehicle interior 5 of hybrid vehicle 2. A fan 19 is situated at F heat exchanger 18 for this purpose. Air is conducted through F heat exchanger 18 with the aid of fan 19, so that the air may absorb heat from the coolant of intermediate fluid circuit 14, so that this air is heated and subsequently introduced into vehicle interior 5. Furthermore, an M heat exchanger 16 is connected to intermediate fluid circuit 14. A fluid circuit 13 having engine oil 29 is additionally connected to M heat exchanger 16. Fluid circuit 13 having engine oil 29 is circulated by a circulating pump (not shown). The heat in the coolant of intermediate fluid circuit 14 may thus be transferred to engine oil 29 with the aid of M heat exchanger 16. Intermediate fluid circuit 14 is also connected similarly to a G heat exchanger 17. A further fluid circuit 13 having transmission oil 30, which is circulated by a circulating pump (not shown), therefore flows through G heat exchanger 17. Heat from the coolant of intermediate fluid circuit 14 may therefore be transferred to transmission oil 30 at G heat exchanger 17 to heat transmission oil 30.

Surroundings 27 of hybrid vehicle 2 may be heated with the aid of a U heat exchanger 31 by intermediate fluid circuit 14. Surroundings 27 of hybrid vehicle 2 are shown as a dashed frame in FIG. 1. Vehicle interior 5 is similarly shown as a dashed frame in FIG. 1.

An actual temperature of charging device 6 may be detected with the aid of an L temperature sensor 21. In addition, the actual temperature of battery 7 may be detected with the aid of a B temperature sensor 22. An F temperature sensor 23 detects the temperature of vehicle interior 5, an M temperature sensor 24 detects the temperature of engine oil 29, and a G temperature sensor 25 detects the temperature of transmission oil 30. The actual temperatures detected by temperature sensors 21, 22, 23, 24, and 25 are relayed with the aid of data lines (not shown) to a control unit 20. Furthermore, valves 28 are situated in intermediate fluid circuit 14. Valves 28 may be operated by control unit 20 with the aid of control lines (not shown). It is possible with the aid of valves 28 to control and/or regulate whether only waste heat from charging device 6, only waste heat from batteries 7, or waste heat from both batteries 7 and charging device 6 is used for heating. Furthermore, it is possible with the aid of valves 28 for control unit 20 to control and/or regulate whether, for example, only the engine oil, only the engine oil and/or the transmission oil, or only vehicle interior 5 is heated. Control unit 20 may therefore select whether engine oil 29, transmission oil 30, vehicle interior 5, and/or surroundings 27 of hybrid vehicle 2 are heated. The waste heat of heat sources 10, i.e., of charging device 6 and battery 7, may therefore be used selectively and optimally for heating.

For example, it is possible to initially use the waste heat of charging device 6 and battery 7 exclusively to heat engine oil 29. For this purpose, valves 28 at F heat exchanger 18, at G heat exchanger 17, and at U heat exchanger 31 are initially closed. The coolant of intermediate fluid circuit 14 therefore flows exclusively through M heat exchanger 16 and through the heat exchangers (not shown) at charging device 6 and at battery 7. After reaching a predefined setpoint temperature of engine oil 29, valve 28 at M heat exchanger 16 is closed and valve 28 at G heat exchanger 17 is opened. Transmission oil 30 is therefore exclusively heated by the waste heat of charging device 6 and battery 7. After reaching a predefined setpoint temperature of transmission oil 30, vehicle interior 5 may be exclusively heated with the aid of the waste heat of charging device 6 and battery 7, in that valves 28 at M heat exchanger 16, G heat exchanger 17, and U heat exchanger 31 are closed and valve 28 at F heat exchanger 18 is opened and fan 19 is turned on. If the desired setpoint temperature has also been reached in vehicle interior 5, the waste heat of charging device 6 and battery 7 may exclusively be discharged to surroundings 27 using U heat exchanger 31. For this purpose, the three valves 28 at M heat exchanger 16, G heat exchanger 17, and F heat exchanger 18 are closed and valve 28 at U heat exchanger 31 is opened, so that the waste heat of charging device 6 and battery 7 is exclusively discharged by U heat exchanger 21 to surroundings 27 of hybrid vehicle 2.

Figure 2:
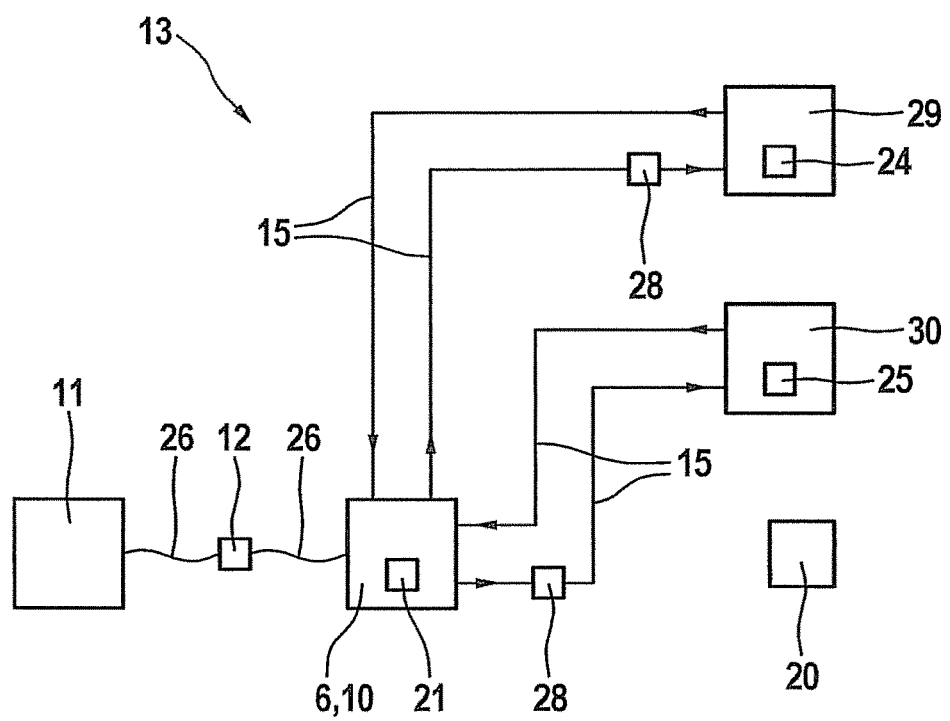
FIG. 2 shows a schematic system diagram of the heating device in a second exemplary embodiment.

A second exemplary embodiment of heating device 1 is shown in FIG. 2. Generally only the differences from the first exemplary embodiment according to FIG. 1 are described hereafter. Heating device 1 has two fluid circuits 13. Engine oil 29 flows to a heat exchanger (not shown) at charging device 6 in a first fluid circuit 13. Transmission oil 30 flows through a second fluid circuit 13 to a heat exchanger (not shown) at charging device 6. Therefore, only the waste heat of charging device 6 is used to heat engine oil 29 and transmission oil 30. Engine oil 29 and transmission oil 30 are directly conducted to the heat exchanger at charging device 6, so that engine oil 29 and transmission oil 30 are heated directly at charging device 6 without an intermediate fluid circuit 14. To control whether only engine oil 29, only transmission oil 30, or both engine oil and transmission oil 30 are heated, a valve 28 may be opened or closed in each case in first and second fluid circuits 13 with the aid of control unit 20. Partial openings of valve 28 are also possible, so that intermediate positions for heating engine oil 29 and transmission oil 30 are also possible. This is also similarly true for valves 28 for the first exemplary embodiment.

Overall, significant advantages are connected to heating device 1 according to the present invention for an engine and/or transmission oil 29, 30 and the example method according to the present invention for heating engine and/or transmission oil 29, 30. The waste heat of charging device 6 and battery 7 may be used during the idle time of hybrid vehicle 2 for heating engine and transmission oil 29, 30. The fuel consumption of internal combustion engine 3 for driving hybrid vehicle 2 may therefore be significantly reduced during a startup of internal combustion engine 3 due to heated engine and/or transmission oil 29, 30.

What is claimed is:

1. A method for heating engine and/or transmission oil of a hybrid vehicle, the hybrid vehicle having at least one battery, a charging device, an internal combustion engine and an electric motor, the method comprising:
   heating the engine oil and the transmission oil with the aid of:
   i) waste heat emitted by the charging device for the at least one battery, and
   ii) waste heat emitted by the at least one battery;
   wherein a fluid circuit having the at least one of the engine oil and the transmission oil as the fluid is thermally coupled to at least one of the charging device and the at least one battery for indirect or direct heating of the at least one of the engine oil and the transmission oil and heating the engine oil and the transmission oil is not aided by a heat source that is external to the vehicle.

2. The method as recited in claim 1, wherein the at least one of the engine oil and the transmission oil are at least one of:
   i) heated during charging of the at least one battery, and
   ii) heated during idle time of the hybrid vehicle.

3. The method as recited in claim 1, wherein the at least one of the engine oil and the transmission oil are heated before beginning travel.

4. The method as recited in claim 1, wherein the waste heat is conducted to the at least one of the engine oil and the transmission oil with the aid of at least one of heat convection, heat conduction, and thermal radiation.

5. The method as recited in claim 1, wherein the fluid circuit is heated by at least one of the waste heat of the charging device and the at least one battery.

6. The method as recited in claim 1, wherein an actual temperature of at least one of the engine oil and the transmission oil is detected, the actual temperature is compared to a setpoint temperature of the at least one of the engine oil and the transmission oil, and the at least one of the engine oil and the transmission oil are heated in the event of a deviation of the actual temperature from the setpoint temperature.

7. The method as recited in claim 1, wherein the waste heat which is not required for the heating of the at least one of the engine oil and the transmission oil, is conducted into at least one of surroundings of the hybrid vehicle, and the vehicle interior.

8. A heating device for engine and/or transmission oil of a hybrid vehicle having at least one battery, a charging device, an internal combustion engine and an electric motor, the heating device comprising:
  a fluid circuit having a fluid; and
  a heat source for heating the engine oil and the transmission oil, with the aid of the fluid circuit;
  wherein the fluid circuit is thermally coupled to the charging device and the at least one battery, so that the heat source is the charging device and the at least one battery, in order to heat the engine oil and the transmission oil with the aid of the waste heat emitted by the charging device and the at least one battery;
  wherein the fluid circuit having the at least one of the engine oil and the transmission oil as the fluid is thermally coupled to at least one of the charging device and the at least one battery for indirect or direct heating of the at least one of the engine oil and the transmission oil.

9. The heating device as recited in claim 8, wherein the fluid of the fluid circuit is the at least one of the engine oil and the transmission oil, and the at least one of the engine oil and the transmission oil in the fluid circuit is conductible to the at least one of the charging device and the at least one battery to heat the at least one of the engine oil and the transmission oil at the at least one of the charging device and the at least one battery.

10. The heating device as recited in claim 8, wherein the heating device includes an intermediate fluid circuit, which is thermally coupled to the at least one of the charging device and the at least one battery.

11. The heating device as recited in claim 10, wherein the intermediate fluid circuit is at least one of thermally coupled to the engine oil with the aid of a heat exchanger, thermally coupled to the transmission oil with the aid of a heat exchanger, and thermally coupled to a vehicle interior with the aid of a heat exchanger.

12. The heating device as recited in claim 8, wherein the heating device includes at least one of a temperature sensor for detecting an actual temperature of the charging device, and a temperature sensor for detecting an actual temperature of the at least one battery.

13. The heating device as recited in claim 8, wherein the heating device includes at least one of a temperature sensor for detecting an actual temperature of the vehicle interior, a temperature sensor for detecting an actual temperature of the engine oil, and a temperature sensor for detecting an actual temperature of the transmission oil.

14. A heating device for a hybrid vehicle having at least one battery and a charging device, the heating device configured to heat engine oil and transmission oil using waste heat emitted by the charging device for the at least one battery and the at least one battery;
  wherein a fluid circuit having the at least one of the engine oil and the transmission oil as the fluid is thermally coupled to at least one of the charging device and the at least one battery for indirect or direct heating of the at least one of the engine oil and the transmission oil.

15. The method as recited in claim 1, wherein at least one valve is situated in the fluid circuit and controls and/or regulates an amount of i) the waste heat of the charging device for the at least one battery, and ii) the waste heat of the at least one battery.

16. The method as recited in claim 15, wherein the at least one valve is controlled by a control unit.

17. The method as recited in claim 8, wherein at least one valve is situated in the fluid circuit and controls and/or regulates an amount of i) the waste heat of the charging device for the at least one battery, and ii) the waste heat of the at least one battery.

18. The method as recited in claim 17, wherein the at least one valve is controlled by a control unit.

19. The method as recited in claim 1, further reciting controlling valves by a control unit to control and/or regulate whether (i) only waste heat from the charging device; (ii) only waste heat from the battery; and/or (iii) waste heat from both the charging device and the battery is used for heating.

* * * * *